Figure 1:
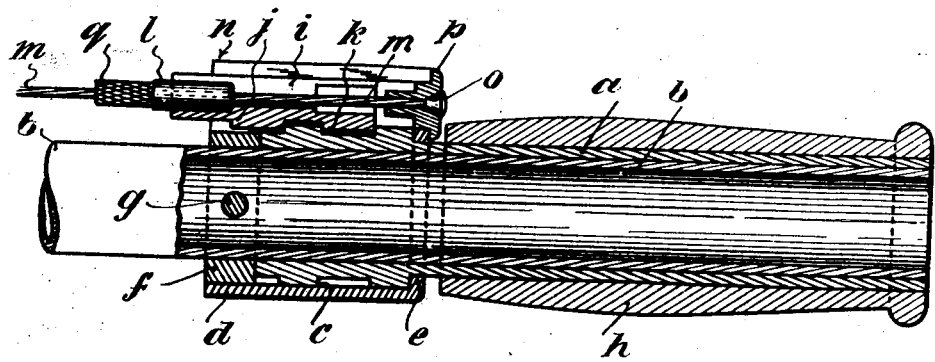

Oct. 6, 1925.

C. BROWN 1,556,411

FLEXIBLE POWER TRANSMISSION MECHANISM

Filed Feb. 1, 1924

Inventor:—
Clement Brown,
By:—
Fowler and Smith,
Attorneys.

Patented Oct. 6, 1925.

1,556,411

UNITED STATES PATENT OFFICE.

CLEMENT BROWN, OF WITTON, NEAR BIRMINGHAM, ENGLAND, ASSIGNOR OF ONE-HALF TO BROWN & BARLOW LIMITED, OF WITTON, NEAR BIRMINGHAM, ENGLAND.

FLEXIBLE POWER-TRANSMISSION MECHANISM.

Application filed February 1, 1924. Serial No. 689,927.

*To all whom it may concern:*

Be it known that I, CLEMENT BROWN, a subject of the King of Great Britain, residing at Carburet Works, Witton, near Birmingham, England, have invented certain new and useful Improvements in or Relating to Flexible Power-Transmission Mechanism, of which the following is a specification.

This invention comprises certain improvements in or relating to flexible power transmission mechanism of the well-known Bowden type, involving an outer incompressible member and an inner cable or inextensible member. Usually in this type of mechanism the internal member has been displaced within the external member by a pull action.

According to one feature of the present invention the external member is used as a power transmitting member. To enable it to fulfil this function one end of the external member may be displaced in relation to the internal member. This displacement may be of a character such as to result in a cambering of the transmission mechanism so that the end of the outer member remote from that which is actuated may remain stationary throughout the operation, the cambering resulting in a relative displacement of the external and internal members such as is adapted to obtain the desired transmission of power. In the case of a motorcycle the cambering may readily be accommodated at the juncture of the handle-bar at the head of the cycle frame, at which point cambering may ordinarily have to be provided for to permit of the steering function.

Alternatively, however, the internal member may be anchored at both ends and the external member may be bodily displaced upon the internal member to transmit the power in which embodiment no cambering of the mechanism is necessary.

Advantageously the present invention is utilized for the purpose of operating an accessory such as a carburettor, brake or the like utilized upon a motor-cycle, cycle or the like so that such accessory may be actuated from a position in the vicinity assumed by the hand in ordinary driving and steering, and we may conveniently operate the mechanism according to the present invention by the utilization of a rotating hand grip.

A further feature of the present invention resides in the utilization of a rotating hand grip which itself is axially immovable, but by virtue of rotation is adapted to displace the external element of the power transmission mechanism.

The power transmission mechanism is advantageously located externally of the handle-bar although it may alternatively be located internally, and in either or both cases the power transmission mechanism is advantageously so located that the axis of that extremity thereof which co-operates with the hand grip is parallel with or aligned with the axis of the hand grip.

Thus, when the power transmission mechanism is cambered in the act of transmitting power thereby, that part of the internal cable or member which is flexed or diverted in the action, occurs within the interior of the sheath or outer member. Thus any part of the internal member which might be exposed to the atmosphere or elements is relieved from the necessity of having to resist the flexing stress; this preserves the internal cable and thus detracts from breakage thereof.

By the utilization of the hand grip which rotates but which is axially immovable, it is possible to employ at the extremity of a cycle handle-bar tube, an inverted brake lever, and in addition the entire means for actuating the power transmission mechanism are confined in an eminent degree of their axial dimension.

In one arrangement I employ a rotating hand grip which is suitably restrained from axial movement and which is furnished with a screw-thread which is adapted to co-operate with a sliding bolt. This sliding bolt is adapted to co-operate with and to advance the sheath of the power transmission mechanism. The internal cable or member of the power transmission mechanism is anchored from axial movement conveniently to the part which is utilized for restraining axial movement of the hand grip.

In order that this invention may be more clearly understood and readily carried into practice, reference may be had to the appended sheet of explanatory drawings, on which Figure 1 is a sectional elevation illustrating an embodiment of the present invention.

Figure 2:
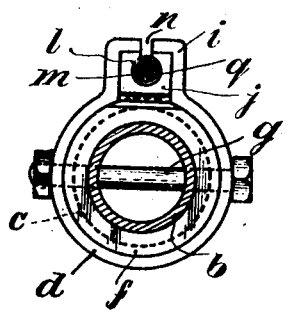

Figure 2 is a transverse section of the mechanism shown in Figure 1.

In a convenient embodiment of the present invention, I provide a tubulus *a* adapted to encircle the end of the handle-bar tube *b*. Forwardly this tubulus is formed externally with a screw-thread *c*. Adapted to be slipped over the tubulus *a* from the rear is a casing *d*. This casing is formed at its rear with an inward flange *e* which limits its forward assemblage by virtue of an abutment relationship with the rear of the screw-thread *c* on the tubulus *a*.

A ring or annulus *f* previously slipped upon the handle-bar tube *b* is assembled rearwardly into the casing *c*. A pin or bolt *g* is then passed laterally through the ring *f*, casing *d* and handle-bar tube *b*. The casing *d* and ring *f* are thus locked from axial and rotary movement. The ring *f* forms a stop restraining the screwed tubulus *a* from forward movement. The screwed tubulus *a* may rearwardly of the casing externally be furnished with a rubber or other grip surface *h*.

The casing is at one point in its periphery provided with a housing *i*. In this housing a slide *j* is adapted to move in parallelism with the axis of the hand grip *h*. This slide is furnished with teeth *k* or screw formations adapted to co-operate with the screw *c* upon the tubulus *a* of the hand grip *h* so that when the latter is rotated the slide *j* is advanced axially. At its fore extremity the slide *j* is recessed for the reception of the rear extremity *l* of the outer member *q* of the power transmission mechanism.

Thus when the slide *j* is advanced this rear extremity *l* of the power transmission mechanism is likewise advanced in an axial direction. The internal element *m* of the power transmission mechanism passes through the slide *j* and is anchored to the rear of the housing *i* in which said slide *j* operates. For this purpose both slide *j* and housing *i* may be slotted radially of the handle-bar as shown at *n* so that the internal cable *m* fitted with a suitable head *o* may be assembled radially and the head engaged within a counter-sinking in a rear detachable closure member or nipple *p* with which the housing *i* is fitted.

At its extremity remote from the hand grip *h* the outer member *q* of the power transmission mechanism may be secured within the cap of a sliding valve type of carburettor, and the internal member *m* passes into the interior of the carburettor so that when the operating slide *j* is advanced forwardly by the hand grip *h* the sliding valve of the carburettor is raised or moved towards the cap by virtue of the cambering of the external member.

Alternatively, however, the internal member may be anchored to the carburetor body so that the external member moves at its end remote from the hand grip without involving any cambering, and is thus adapted at this remote end to actuate the desired part of the carburettor in any approved manner.

In cases in which the power is transmitted by virtue of the cambering of the mechanism, a spring controlling the moving part of the carburettor may serve to retain the external part *q* of the power transmission member in its appropriate position within a socketing provided in the slide *j* which is operated by the hand grip *h*.

Obviously, however, this sheath *q* of the cable *m* may be secured within the said socket permanently for instance by soldering or brazing.

The carburettor may also function to limit the forward movement of the slide which is actuated by the hand grip by reason of the sliding valve of the carburettor moving into abutting relationship with the carburettor cap. In this case also other approved provision may alternatively be incorporated in conjunction with the slide itself for this purpose.

Having described my invention, what I claim and desire to secure by Letters Patent is:—

1. An operating mechanism for flexible power transmissions of the Bowden type comprising a casing, a block housed within the casing and movable into and out of the same, one element of the Bowden device extending longitudinally through the casing and being secured to the inner end thereof, the other element of the Bowden device being secured to the block, and means to move the block within the casing to operate the Bowden device, said block being apertured to permit free movement of the block with respect to the Bowden element secured to the casing.

2. An operating mechanism for flexible power transmissions of the Bowden type comprising a casing, a block mounted therein, means to move the block within the casing, one element of the Bowden device being secured to the block and the other element thereof extending longitudinally through the casing and being secured to the inner end thereof, said casing being longitudinally slotted to permit insertion of the second mentioned Bowden element and said block being slotted and mounted in straddled relation with respect to said Bowden element whereby to permit free movement of the block within the casing.

3. An operating mechanism for flexible power transmissions of the Bowden type comprising a casing, a block slidably mounted therein, fastening means carried by the casing and adapted to receive the inner member of the Bowden device, the outer member thereof being secured to the block, and means to move the block away from said fastening means whereby to cause the outer member of the Bowden device to camber or flex to operate the inner member thereof.

4. An operating mechanism for flexible power transmissions of the Bowden type comprising a tubular member having a spiral rib on its outer surface, a casing surrounding one end of the tubular member and enclosing the ribbed portion thereof, the casing being bent to form a chamber at one side of the tubular member, a block movably mounted in the chamber, a closure plug for one end of the chamber, said block being recessed to engage the spiral rib of the tubular member, said tubular member and casing being adapted to be mounted upon a common support with the outer element of the Bowden device secured to the block, the inner element thereof secured to the closure plug and the casing secured to the support, and means to rotate the tubular member whereby to move the block out of the chamber to camber or flex the outer member of the Bowden device to operate the same.

5. The combination with a cylindrical support, of an operating mechanism for flexible power transmissions of the Bowden type comprising a tubular member rotatably mounted on the support, a casing secured to the support and enclosing one end of the tubular member, a spiral rib carried by the tubular member within the casing, a block slidable within the casing and having interfitting engagement with the rib, said casing being formed to define an open-ended chamber extending longitudinally at one side of the casing, a closure plug for the inner end of the chamber, said other end being open to permit the entrance of the elements of the Bowden device, said elements being secured to the block and closure plug respectively, whereby rotation of the tubular member functions to move the block to thereby operate the Bowden device.

6. The combination with a cylindrical support, of a rotatable tubular member mounted thereon, a spiral rib carried by the tubular member, a casing secured to the support and surrounding the ribbed portion of the tubular member, said casing being provided with an annular inturned flange adapted to engage said rib to prevent relative axial movement of the casing and tubular member, said casing being formed to define an open-ended chamber at one side of the tubular member, a block slidable therein and having interfitting engagement with the spiral rib, the outer element of the Bowden device being secured to said block, and a closure plug for the inner end of the chamber, the inner end of the Bowden device being secured thereto, said block being slotted longitudinally to permit free movement of the block with respect to the inner Bowden member when the tubular member is rotated upon the support.

In testimony whereof I hereunto affix my signature.

CLEMENT BROWN.